Feb. 6, 1945.   C. M. OSTERHELD   2,368,772
ELECTRIC TANK HEATER
Filed Feb. 3, 1943   2 Sheets-Sheet 1
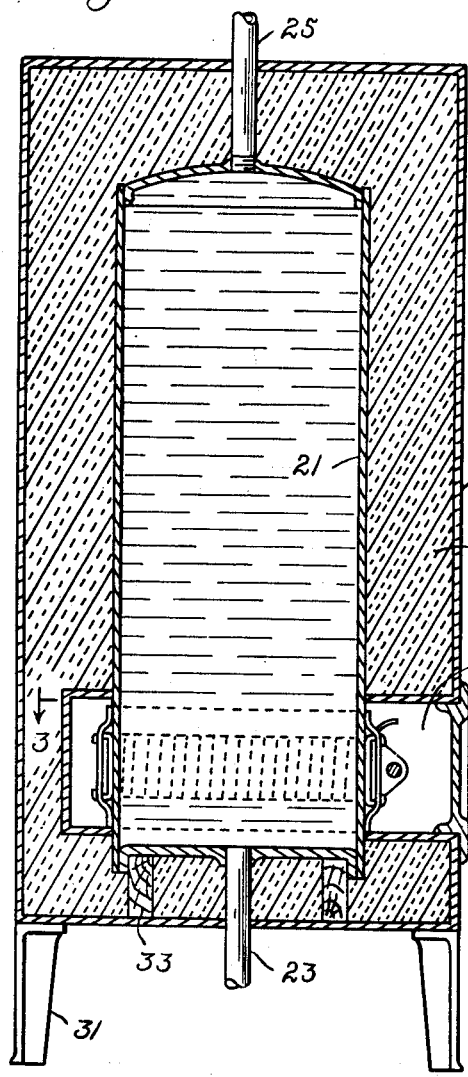
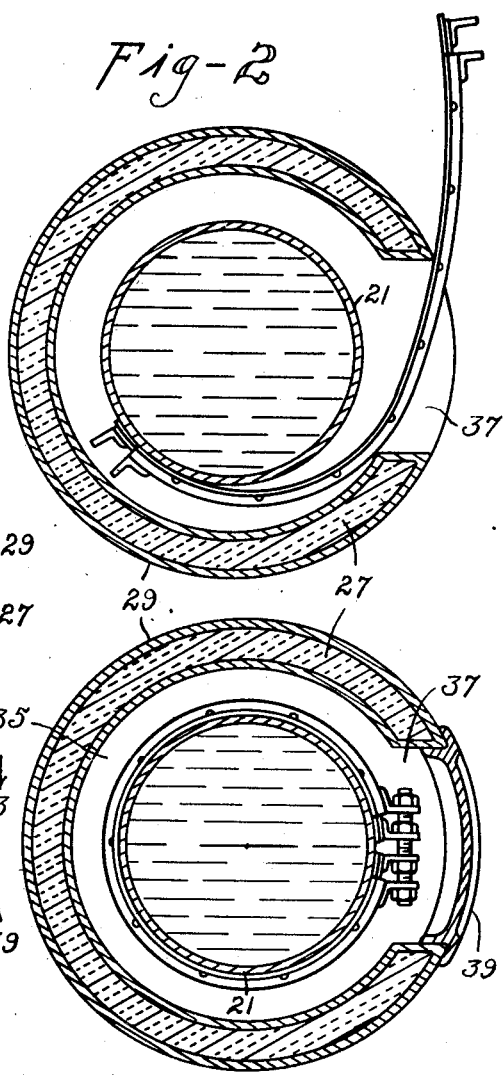
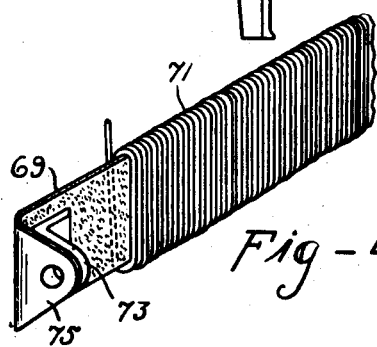
INVENTOR.
CLARK M. OSTERHELD

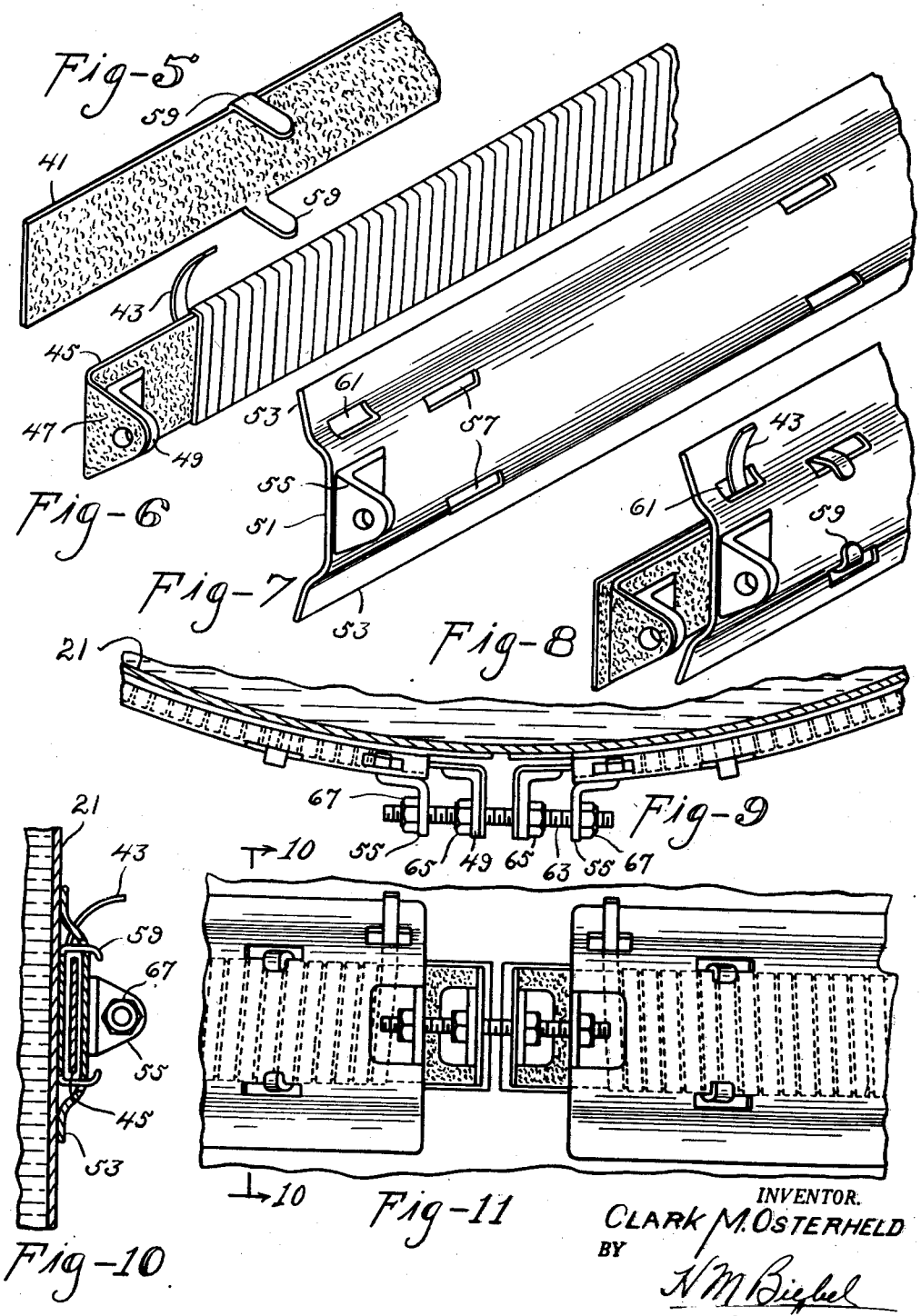

Patented Feb. 6, 1945

2,368,772

UNITED STATES PATENT OFFICE 2,368,772

ELECTRIC TANK HEATER

Clark M. Osterheld, Stoughton, Wis., assignor to McGraw Electric Company, Elgin, Ill., a corporation of Delaware Application February 3, 1943, Serial No. 474,533

6 Claims. (Cl. 219—39)

My invention relates to electric heating units and particularly to electric tank heating units.

An object of my invention is to provide a relatively simple, inexpensive and highly efficient electric heater for domestic hot water tanks.

Another object of my invention is to provide an electric tank heater including efficient means for conducting the heat generated in the resistor to the tank.

Another object of my invention is to provide an electric tank heater having a minimum thickness of dielectric or electric-insulating material, which material is highly heat-conducting and high temperature-resisting.

Other objects of my invention will either be apparent from a description of one form of electric tank heater embodying my invention or will be pointed out in the course of such description and be set forth in the appended claims.

In the drawings,

Figure 1 is a vertical sectional view of a domestic hot water tank showing the application thereto of an electric heating unit embodying my invention, Fig. 2 is a horizontal sectional view therethrough showing the method of mounting such a heater in operative relation to the tank or of removing it therefrom, Fig. 3 is a horizontal sectional view taken on the line 3—3 of Fig. 1 showing the heater mounted in proper operative position around a tank, Fig. 4 is a fragmentary perspective view of a heating element embodying my invention, Fig. 5 is a fragmentary perspective view of an inner spacing strip member comprising a part of my improved heating unit, Fig. 6 is a fragmentary perspective view of a resistor heating element, Fig. 7 is a fragmentary perspective view of an outer shroud or sheath member comprising a part of my improved heating unit, Fig. 8 is a fragmentary perspective view of an assembly of the members shown in Figs. 5, 6 and 7, Fig. 9 is a fragmentary horizontal sectional view showing the method of clamping an assembled heater embodying my invention, around a tank, Fig. 10 is a fragmentary vertical sectional view taken on the line 10—10 of Fig. 11, and, Fig. 11 is a front elevational view of the parts shown in Figs. 9 and 10.

Referring first to Figs. 1, 2, and 3 of the drawings I have there shown a hot water tank 21 which is of the usual domestic kind used in homes and which is provided with a lower cold water inlet pipe 23 and an upper hot water outlet pipe 25. I may provide a mass 27 of heat-insulating material around the tank and may provide a suitable outer cover 29 therefor all in a manner now well known in the art. The outer cover 29 may have a plurality of supporting legs 31 at its bottom end. The tank 21 may be spaced from the lower part of outer casing 29 by a plurality of blocks 33 which may be of wood or of any other suitable non-heat-conducting material used in the art.

I provide a tunnel member 35 around the tank 21 and any suitable or desired material may be used to build up the top, the bottom and the outer wall of such tunnel member. At one part of the periphery of the tunnel 35 I provide an opening 37 which may be normally covered by a closure member 39 all as now well known in the art. I have not shown any means for holding the tunnel member in the desired position since means effective for this purpose are well known in the art and form no part of my present invention.

Referring now to Figs. 5 to 8 inclusive I have there shown an inner or spacer strip 41 which is preferably, although not necessarily, made of relatively thin aluminum, the thickness of which may be on the order of .015" or slightly larger. The entire outer surface of this spacer strip 41 may have provided thereon an integral anodic coating as is shown by the stippling in Figs. 5, 6 and 8 of the drawings and by such coatings I refer not to the relatively very thin normal or usual coating occurring on the surface of aluminum members when exposed to the air. The integral anodic coating above referred to is that obtainable by electrolytic methods now well known in the art or by immersion of aluminum articles in a suitable solution whereby a coating having a thickness on the order of .0015" or slightly more is provided on the surface. This coating is of a dielectric nature or as may be otherwise stated is electric-insulating, and is heat-conducting, high temperature resisting and of such a character further that it will stand up without cracking, flaking or breaking thereof when the material to which it is coherent is bent to some other shape. Such a coating is not adherent but is an integral part of the aluminum surface. I desire it to be further understood that while I prefer to use aluminum for the inner or spacing strip I do not desire to be limited thereto since it has been discovered that other metals may have provided thereon anodic coatings having the above mentioned characteristics.

I have illustrated in Fig. 6 a flat strip resistor conductor 43 which is preferably also made of aluminum and which may have provided thereon an anodic coating having the above described characteristics which will permit of winding the resistance conductor 43 in close operative engagement around a strip 45 with the adjacent turns thereof in close operative engagement. This permits of obtaining a greater heating capacity for any given length of coiled resistance conductor 43 and such resistor element therefore clearly distinguishes from the kind which it is now necessary to use wherein an appreciable space must be left unoccupied between adjacent turns to prevent breakdown therebetween all as is now well known in the art. It is to be noted that it is not necessary that the conductor 43 be provided with an anodic coating since it is only necessary under such conditions that the adjacent turns be out of operative engagement with each other to prevent breakdown therebetween. While I have above stated that I prefer to use aluminum conductors I am not limited thereto since resistance conductors now well known in the art such as Nichrome may be used and provided or not, as above stated, with an anodic coating.

The resistor supporting strip 45 may be made, and I prefer to make it, of relatively thin aluminum on the order of .015", thick which strip is preferably provided with an anodic coating having the above described characteristics. It is therefore evident that if the conductor 43 has an anodic coating there will be two thicknesses thereof between the conductor and the metallic supporting strip 45 around which the conductor is wound as above described. However if the conductor 43 is not provided with an anodic coating there will still be one thickness of such electric-insulating coating between the conductor and the support 45.

I wish further to point out here that it is not necessary that the strip 45 be of metal but it may be made of any other suitable material having electric-insulating characteristics such as mica or micanite or perhaps other materials having electric-insulating characteristics which are at the same time sufficiently flexible to permit of being bent around a hot water tank or around any other suitable appliance or apparatus which is to have the heater operatively associated therewith and have sufficient strength to withstand the tension to which it will be subjected when clamped tightly around a tank.

The strip 45 has end portions 47 bent at right angles thereto, each end portion having mechanically operatively secured thereto an L-shaped lug 49, for strengthening purposes. The length of the strip 45 is made such that the end portions 47 will be spaced apart a small distance as is shown by reference to Figs. 3 and 9 of the drawings for purposes to be hereinafter referred to in detail.

It is obvious that, generally speaking, there are two directions in which the heat generated in a resistor of this kind may flow relatively to the tank 21, the first of these directions being that from the conductor to the tank and the second being from the conductor away from the tank. Where the strip 45 is of appreciable width say on the order of one or more inches, as may be found desirable or suitable, the heat generated in that part of the resistance conductor operatively engaging the inner side of the strip 45 will flow in the first direction while the heat generated in that part of the conductor adjacent to the outer side of the strip 45 will flow outwardly and unless effective means are provided for receiving this heat and causing it to flow toward and then into the tank 21 this heat will be lost.

Referring now to Fig. 7 of the drawings I have there illustrated a shroud or outer sheath member 51 which member is of flattened channel-shape in lateral section. While I prefer to make the shroud member 51 of relatively thin aluminum I do not desire to be limited thereto, but prefer aluminum because of its high heat conductivity. The side edge portions 53 of member 51 are made relatively wide and the two side portions are not co-planar but the planes thereof extend at an angle slightly less than but approaching 180° relatively to each other, so that when clamped around a tank the entire lateral faces or surfaces of the side edge portions thereof will engage the outer tank surface. I provide a clamping lug 55 at each end of the sheath or cover member 51 for a purpose to be hereinafter referred to.

Shroud 51 is provided with a plurality of spaced openings 57 therein adapted to receive securing lugs 59 which are either integral with or secured to the spacing strip 41 at the side edges thereof. I have shown, in Fig. 8, the members 41, 43, 45 and 51 when assembled in proper operative positions relative to each other and before they are mounted around a tank. End portions of the conductor 43 may extend outwardly through openings 61 in the sheath and if the resistance conductor 43 is provided with an anodic coating it will make no appreciable difference if there is operative contact between the conductor 43 and the walls of the opening 61 in the shroud 51.

Referring now to Fig. 2 of the drawings I have there shown a method of mounting the heating element comprising members 41, 43, 45 and 51 in the tunnel 35 and the heating unit is shown as having already been partially moved into the tunnel and around the tank 21. When the heating unit has been moved into proper operative position in the tunnel 35 with the lower side edge portions 53 resting on the lower wall of the tunnel, the lugs 49 and 55 being symmetrically located with regard to the side walls, a clamping means comprising a screw threaded rod 63 may then be extended through these lugs through openings therein. Nut 65 may first be provided on the rod 63 to engage the two lugs 49 and proper turning movement of the nuts 65 on the rods 63 toward each other will serve to clamp tightly the heating unit against the outer surface of the tank. The clamping tension applied to the lugs 49 or end of strip 45 will cause tight operative engagement of the heating element comprising particularly the supporting strip 45 and the resistor conductor 43 wound thereon against the outer surface of the spacing strip 41 and will also cause good heat conducting engagement between the inner side or surface of the strip 41 and the outer surface of the tank 21. A pair of nuts 67 may then be tightened on the rod 63 into clamping and tensioning engagement with the lugs 55 whereby the shroud 51 is moved into good heat-conducting engagement with the conductor 43 and the outer surface of the tank. It is obvious that the central portion of strip 51 will be caused to closely engage the conductor 43 and those parts thereof on the outside of the strip 45 while the side edge portions 53 will be caused to closely engage the outer surface of the tank immediately adjacent to the heating element proper. The entire surface of each of the side edges will be moved into engagement with the outside surface of the tank as is shown more particularly in Fig. 10 of the drawings so that the heat flow path from the conductor 43 into the shroud 51 and from the shroud 51 to the outside surface of the tank will have a relatively low thermal reluctance.

Referring now particularly to Fig. 4 of the drawings I have there illustrated another form of heating element comprising a supporting strip 69 which is of the same general character as the strip 45 hereinbefore described and which has wound thereon a resistance conductor 71 which may be of wire form. The resistance conductor 71 may be provided with an anodic coating of the hereinbefore described kind so that the adjacent turns thereof may be wound closely on the strip 69 and be in operative engagement with each other as is shown in Fig. 4. The strip 69 is provided with a lug 73 of substantially L-shape and is bent over an end portion 75 at each end thereof so that the strip 69 with the conductor 71 mounted or wound thereon may be clamped around a tank 21 as has already been hereinbefore described in connection with the strip 45 and the conductor 43.

Reference to Figs. 8, 10 and 11 will show one method of securing members 41, 43, 45 and 51 in proper operative positions relatively to each other. It will be noticed that the outer end portions of lugs 59 may be bent over against the midportion of shroud 51 but it is not necessary that any appreciable pressure be provided by this means since the shroud 51 and its tensioning clamping means hereinbefore described will hold the parts in close operative engagement around a tank as has already been hereinbefore described.

Various modifications may be made in the device embodying my invention without departing from the spirit and scope thereof and all such modifications clearly coming within the scope of the appended claims are to be considered as being covered thereby.

I claim as my invention:

1. An electric heating unit adapted to be mounted around a domestic hot water tank, said unit comprising a heating element consisting of a strip of material having electric-insulating characteristics and a resistor conductor wound therearound, a metallic sheath, of substantially channel-shape in lateral section covering said heating unit, said resistor conductor and at least the inner surface of the sheath having thereon an inorganic, integral, heat-conducting, high temperature-resisting and electric-insulating coating and means to draw the ends of the strip of material toward each other to hold the parts of the turns of the resistance conductor adjacent to the inner surface of the strip of material in good operative heat conducting engagement with the outer surface of a tank and means to draw the ends of said metallic sheath toward each other to hold the mid-portion of the sheath in good heat-conducting engagement with the parts of the turns of the resistance conductor adjacent to the outer surface of the strip of material and to hold the edge portions of the sheath in good heat conducting engagement with the outer surface of the tank.

2. An electric heating unit adapted to be mounted around a hot water tank, said unit comprising an inner metallic spacer strip extending around a tank, a resistor-supporting strip having electric-insulating characteristics, a metallic resistor conductor wound on said resistor-supporting strip, a metallic sheath, of substantially channel-shape in lateral section, extending circumferentially of a tank outside of said spacer and said resistor-supporting strip, the outer surface of said spacer strip, and the inner surface of said sheath having thereon an integral, inorganic, heat-conducting, high temperature-resisting and electric-insulating coating and adjustable clamping means mechanically engaging the end portions of said sheath to draw the ends thereof toward each other and cause it to clamp the resistor-supporting strip and the resistor thereon into good heat-conducting operative engagement with the tank and to press the side portions of the sheath into good heat-conducting engagement with a tank.

3. An electric heating unit adapted to be secured around a hot water tank, said unit comprising an inner metallic spacer strip to extend around a tank, a metallic resistor-supporting strip adapted to extend around a tank outside of said spacer strip, a resistor conductor wound around said resistor-supporting strip, a metallic sheath, of substantially flat channel shape in cross section adapted to extend around a tank outside of said resistor-supporting and said spacer strip, the outer surface of the spacer strip, the entire surface of the resistor-supporting strip and the inner surface of the sheath having thereon an inorganic, integral, heat-conducting, high temperature-resisting and electric-insulating coating and adjustable mechanical means engaging said resistor-supporting strip and said sheath to draw the end portions thereof toward each other to hold them tightly on the tank.

4. An electric heating unit adapted to be secured around a hot water tank, said heating unit comprising a metallic resistor-supporting strip adapted to extend around a tank, a resistance conductor wound on and around said strip, said conductor having thereon an inorganic, integral, heat-conducting, high temperature-resisting and electric-insulating coating, a sheath, of substantially channel-shape in cross-section, adapted to extend around a tank outside of said strip and conductor in operative engagement with the resistor conductor and the outer surface of a tank and adjustable mechanical means engaging the end portions of the strip and of the sheath to draw the end portions toward each other and thereby cause good heat-conducting engagement between the resistance conductor and the tank, between the resistance conductor and the sheath and between the sheath and the tank.

5. An electric heating unit adapted to be secured around a hot water tank, said heating unit including a metallic spacing strip to extend around a tank, a metallic resistor-supporting strip adapted to extend around a tank outside of said spacing strip, a metallic resistor conductor wound around said resistor-supporting strip, a metallic sheath, of substantially flat channel-shape in cross-section adapted to extend around a tank outside of said two strips and resistor conductor, at least the outer surface of said spacing strip, the entire surface of said resistor-supporting strip and of the resistance conductor and at least the inner surface of the sheath having thereon an inorganic, integral, heat-conducting, high temperature resisting and electric-insulating coating and a single adjustable clamping means operatively connected to the end portions of the resistor-supporting strip and of the sheath to draw the opposing end portions toward each other to cause the sheath to be pressed into good heat-conducting engagement with those portions of the resistance conductor located against the outer surface of the resistor-supporting strip and into good heat conducting engagement with the tank, to cause those portions of the resistance-conductor located against the inner surface of the resistor-supporting strip into good heat conducting engagement with the spacing strip and to press the spacing strip into good heat-conducting engagement with the outer surface of a tank.

6. An electric tank heating unit adapted to be mounted around a hot water tank, said heating unit comprising an inner metallic spacer strip to extend around a tank, a metallic resistor-supporting strip adapted to extend around a tank outside of said spacer strip, a resistor conductor wound on and around said resistor-supporting strip, a metallic sheath of substantially flat channel-shape in lateral section adapted to extend around a tank outside of said resistor-supporting and said spacer strips, the surface of said spacer strip, the surface of said resistor-conductor and the surface of said sheath having thereon an inorganic, integral, heat-conducting, high temperature-resisting and electric-insulating coating and adjustable mechanical means engaging the end portions of said resistor-supporting strip and said sheath to draw the said end portions toward each other to clamp said resistor-supporting strip and said sheath tightly around a tank.

CLARK M. OSTERHELD.